United States Patent [19]

Woerner et al.

[11] Patent Number: 4,867,663
[45] Date of Patent: Sep. 19, 1989

[54] SEAL FOR MOLDED PART INSERT

[75] Inventors: Klaus D. Woerner, Cambridge; Andrew T. Meikle, Kitchener, both of Canada

[73] Assignee: ATS Automation Tooling Systems Inc., Kitchener, Canada

[21] Appl. No.: 187,459

[22] Filed: Apr. 28, 1988

[51] Int. Cl.[4] ............................................. B29C 45/14
[52] U.S. Cl. ...................................... 425/111; 249/91; 264/272.11; 264/275; 264/276; 264/328.9; 425/116; 425/121; 425/806
[58] Field of Search ............... 425/110, 111, 116, 117, 425/123, 124–127, 130, 466–460, 570, 571–573, 577, DIG. 47, DIG. 42, DIG. 5, 121, 125, 588, 543–545, 806, 562, 563, 565, 589, DIG. 10, DIG. 35, DIG. 106, DIG. 127, DIG. 131, DIG. 247; 249/83–91, 96, 93, 94, 95; 264/276, 275, 271.1, 259, 328.9, 328.7, 328.12, 272.11, 272.15, 297.2, 241

[56] References Cited

U.S. PATENT DOCUMENTS

| | | | |
|---|---|---|---|
| 2,580,816 | 1/1952 | Morin | 264/328.9 |
| 2,803,851 | 8/1957 | Baunlich et al. | 425/191.5 |
| 2,812,548 | 11/1957 | Quinche et al. | 425/125 |
| 2,937,409 | 5/1960 | Cole | 249/96 |
| 3,238,287 | 3/1966 | Chapman | 264/276 |
| 3,536,806 | 10/1970 | Jackson | 264/276 |
| 3,690,800 | 9/1972 | Schwab et al. | 425/562 |
| 3,825,378 | 7/1974 | Dart et al. | 425/556 |
| 4,030,872 | 6/1977 | Parmann | 425/DIG. 47 |
| 4,372,740 | 2/1983 | Kuramochi et al. | 425/588 |
| 4,511,317 | 4/1985 | Bandoh | 425/121 |
| 4,724,113 | 2/1988 | Lee | 425/DIG. 47 |

FOREIGN PATENT DOCUMENTS

| | | | |
|---|---|---|---|
| 240594 | 6/1965 | Austria | 425/DIG. 42 |
| 3507523 | 7/1986 | Fed. Rep. of Germany | 425/562 |
| 55-117627 | 9/1980 | Japan | 264/328.9 |
| 62-19417 | 1/1987 | Japan | 425/543 |
| 880776 | 11/1981 | U.S.S.R. | 425/233 |
| 960031 | 9/1982 | U.S.S.R. | 425/127 |

Primary Examiner—Jan H. Silbaugh
Assistant Examiner—Mathieu Vargot
Attorney, Agent, or Firm—R. Craig Armstrong

[57] ABSTRACT

An apparatus for sealing around an insert in a molded part to avoid the escape of flash including a mold cavity cooperatively defined by at least two mold blocks, at least one of the mold blocks having at least one insert opening communicating with the cavity. A plunger chamber is substantially co-axial to the insert opening and communicates with the cavity via the insert opening, the plunger chamber having generally greater radial dimensions than the insert opening, thereby defining a generally inwardly-directed flange with respect to the walls of the plunger chamber. The surface of the flange remote from the cavity constitutes a seating surface within the insert opening. A resilient seal is fitted within the plunger chamber against the seating surface in proximity to the insert. A plunger is positioned within the plunger chamber for relative movement generally towards and away from the cavity to compress the resilient seal against the seating surface.

24 Claims, 5 Drawing Sheets

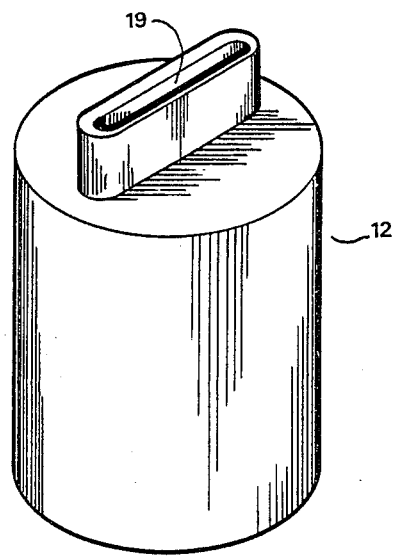
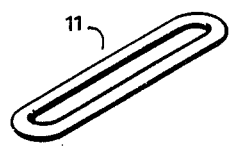
Fig. 6
Fig. 7
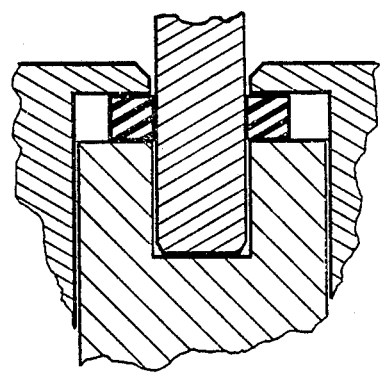
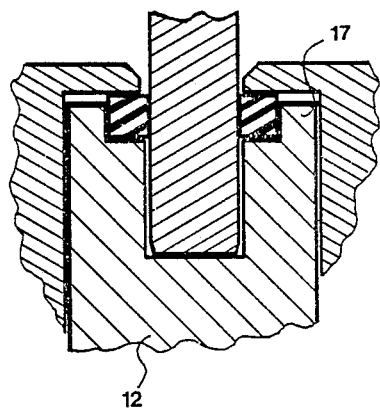
Fig. 8
Fig. 9

SEAL FOR MOLDED PART INSERT

BACKGROUND OF THE INVENTION

1. Field of the Invention

This invention relates to a seal arrangement around an insert in a plastic molding process such as injection molding, to prevent flash from escaping from the cavity at the insert location.

In producing plastic parts having metal inserts such as electrical connectors or plugs which project from the plastic part, a very tight fit of the insert in the cavity is desired so that flash cannot escape. Flash around the insert is cosmetically undesirable, and the flash may also interfere with subsequent assembly operations involving the part.

One solution is to allow the flash to be produced, but to then remove that flash in a subsequent operation. However, especially for parts which may be worth only one or two dollars each, the labour costs involved in removing the flash are proportionately exorbitant. The best solution is to avoid the production of the flash in the first place.

2. Description of the Prior Art

In the prior art, the most common means of avoiding the production of flash has been to machine the insert opening in the cavity to very close tolerances (e.g. plus or minus .001 inch). Even so, flash frequently escapes due to the ordinary production tolerances found in the inserts themselves. There is a need for an improved means of preventing the escape of flash.

SUMMARY OF THE INVENTION

It is an object of the present invention to provide a simple way of effecting the desired seal around inserts.

The apparatus to which the invention relates for the production of plastic molded parts includes a mold cavity cooperatively defined by at least two mold blocks, at least one of the mold blocks having at least one insert opening communicating with the cavity, whereby an insert may be positioned in the insert opening to project into or through the cavity. The invention is directed to preventing the escape of flash from the cavity in the area of each the insert and each the insert opening. In the invention, there is a plunger chamber substantially co-axial to the insert opening and communicating with the cavity via the insert opening, the plunger chamber having generally greater radial dimensions than the insert opening, thereby defining a generally inwardly-directed flange with respect to the walls of the plunger chamber. The surface of the flange remote from the cavity constitutes a seating surface within the insert opening. A resilient seal is fitted within the plunger chamber against the seating surface in proximity to the insert. A plunger is positioned within the plunger chamber for relative movement generally towards and away from the cavity to compress the resilient seal against the seating surface, whereby relative movement generally towards the cavity forces the resilient seal to deform inwardly towards and against the insert to thereby grasp the insert and effect a seal. Means are provided for producing the relative movement of the plunger with respect to the cavity and thus with respect to the resilient seal.

Further features of the invention will be described or will become apparent in the course of the following detailed description.

BRIEF DESCRIPTION OF THE DRAWINGS

The preferred embodiment of the invention will now be described in detail by way of example, with reference to the accompanying drawings, in which:

FIG. 6 is a perspective showing the plunger;

FIG. 7 is a perspective showing the sealing ring;

FIG. 8 is a cross-section showing an alternative seal configuration;

FIG. 9 is a cross-section showing another alternative seal configuration.

DETAILED DESCRIPTION OF THE PREFERRED EMBODIMENT

Figure 1:
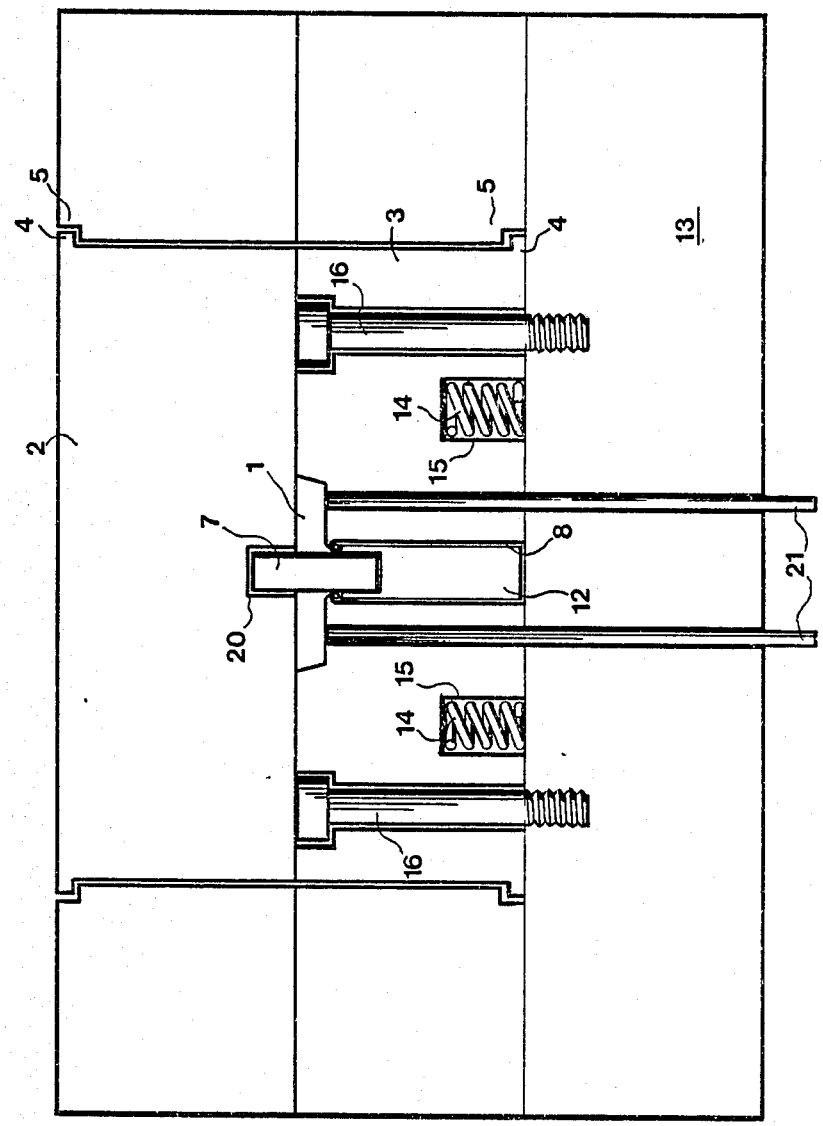
FIG. 1 is a cross-section through the insert and plunger of the preferred embodiment.
Figure 2:
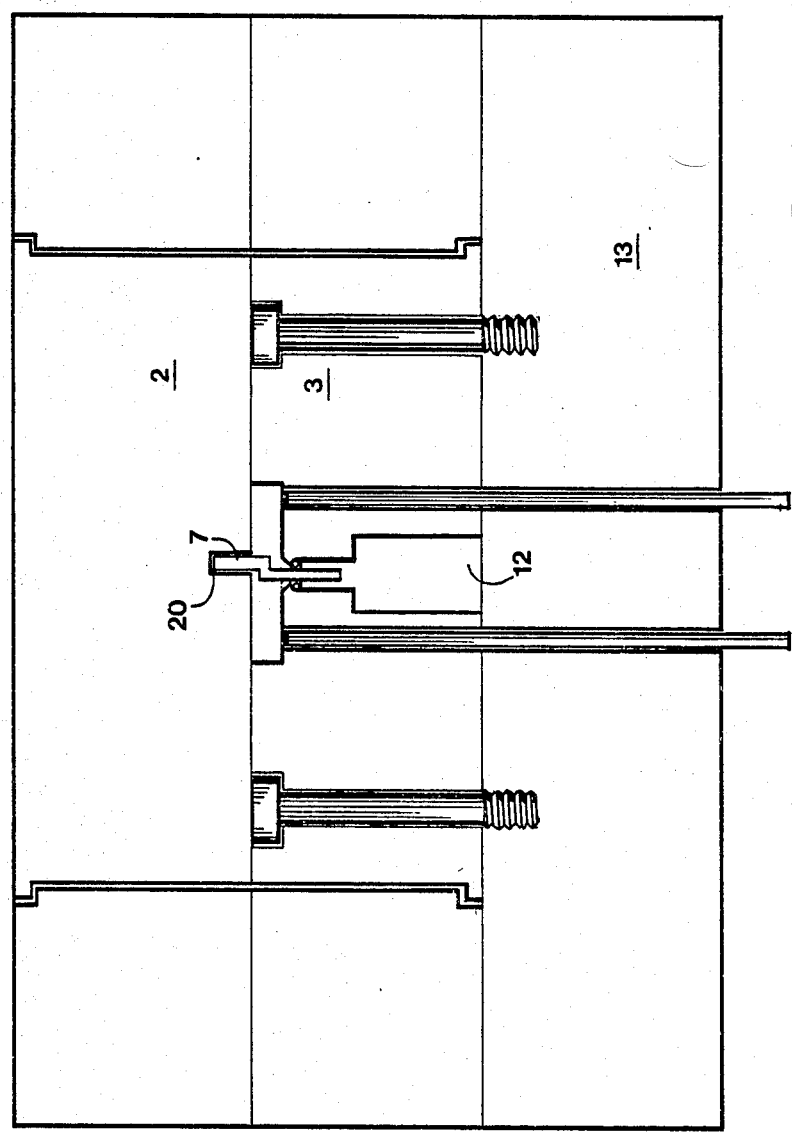
FIG. 2 is a cross-section at ninety degrees to FIG. 1.

Referring to the drawings, the preferred embodiment of the invention includes a mold cavity 1 cooperatively defined by upper and lower mold blocks 2 and 3 respectively. The mold blocks are mounted in universal mold bases of an injection molding machine, by virtue of each mold block having a retention flange 4 which is accommodated in a retention channel 5 in each universal mold base. The upper mold block and mold base (not shown) remain stationary, while the lower mold block and mold base move up and down to close and open the mold. The lower mold block 3 has an insert opening 6 communicating with the cavity, where an insert 7 is positioned to project into, or as shown, through the cavity. In the illustrated embodiment, the invention is shown only in association with the lower mold block 3, but it should be appreciated that the insert opening 20 in the upper mold block 2 could also be provided with the invention. Also, there could be more than two mold blocks for some part configurations, and there could be multiple inserts. The invention may be applied at any one or more of the insert locations, as desired in the particular case.

Figure 3:
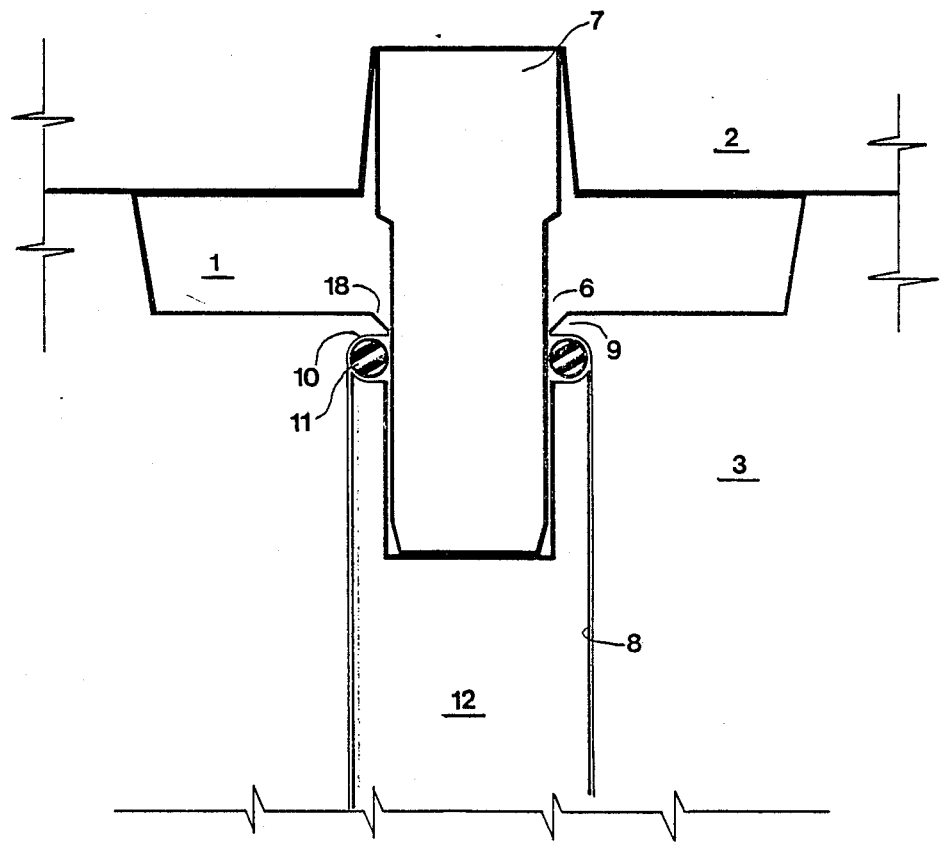
FIG. 3 is a cross-section corresponding to FIG. 1, showing the area of the plunger and seal in greater detail.
Figure 4:
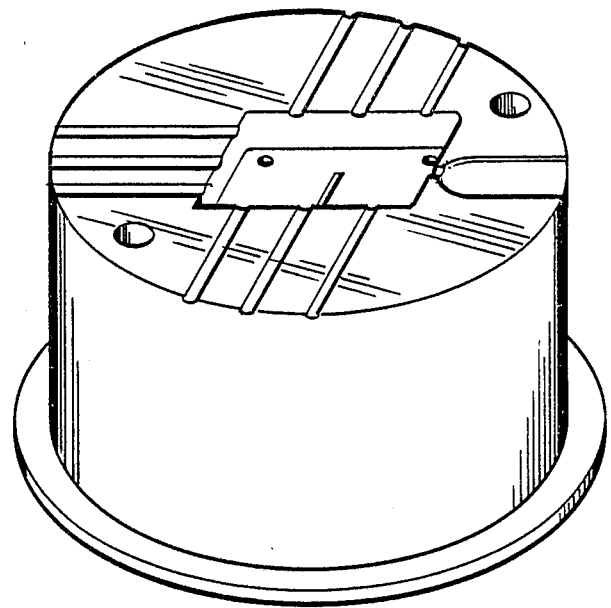
FIG. 4 is a perspective showing the upper side of the lower mold block.
Figure 5:
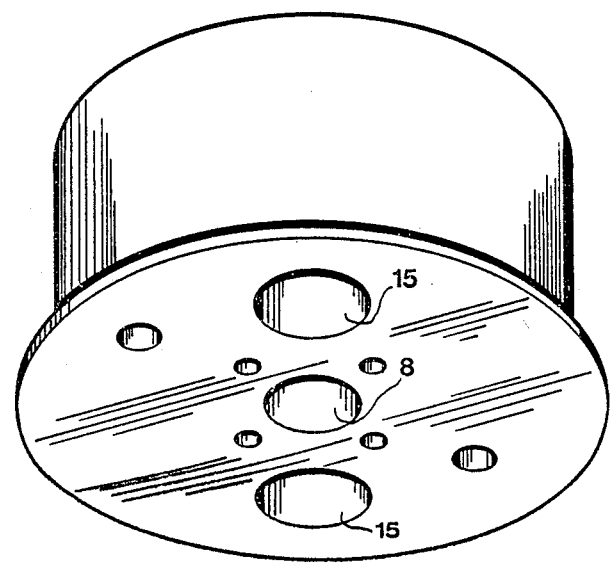
FIG. 5 is a perspective showing the lower side of the lower mold block.

As best seen in FIG. 3, the invention includes a plunger chamber 8 substantially co-axial to the insert opening 6 and communicating with the cavity 1 via the insert opening. The plunger chamber 8 has generally greater radial dimensions than the insert opening, thereby defining a generally inwardly-directed flange 9 with respect to the walls of the plunger chamber 8. The surface of the flange remote from the cavity constitutes a seating surface 10 within the insert opening.

Throughout this specification, the term "axial" will be used to define direction generally parallel to the axes of the insert opening and the plunger, i.e. generally parallel to the direction of travel of the plunger. The term "radial" will be used to generally define directions away from the axial direction. "Inwardly" means generally towards the axis of the plunger, and "outwardly" means generally away from the axis of the plunger. "Upwardly" means the direction in which the plunger travels to deform the sealing ring, and "downwardly" of course has the converse meaning.

A resilient seal 11 fits within the plunger chamber against the seating surface 10 in proximity to the insert 7. A plunger 12 is positioned within the plunger chamber 8 for relative movement generally towards and away from the cavity 1 to compress the resilient seal 11 against the seating surface 10. Movement of the plunger 12 towards the cavity forces the resilient seal to deform inwardly towards and against the insert 7 to thereby grasp the insert and effect a seal.

Any suitable means may be provided for actuating the plunger 12 to produce the desired relative movement. The term "relative movement" is used because in fact the plunger 12 could be stationary, and it could be the lower mold block which is moved towards the plunger. Indeed, in the illustrated embodiment, this is the case. The lower mold block 3 is supported approximately 0.010 inches above the universal mold base 13, spring-biased away from the mold base on two springs 14 in spring chambers 15 in the lower mold block. The approximately 0.010 inches of "play" is provided by virtue of the retention flange 4 at the bottom of the mold block being machined to be that much narrower than the mold block retention channel 5 of the universal mold base 13. The plunger 12 sits on the mold base 13. When the mold closes, the lower mold block 3 is forced against the mold base 13, thereby producing relative movement of approximately 0.010 inches, which is sufficient to compress the resilient seal 11 and produce the desired deformation towards the insert 7. Guide pins 16 are provided to ensure that the mold blocks remain properly aligned at all times.

This particular means of producing the relative motion, while in the preferred embodiment, is not essential to the invention as broadly defined. Any other suitable mechanical means of displacing the plunger with respect to the sealing ring could be used. The plunger could be activated by means of a cam on a camshaft, for example.

The dimensions and shape of the plunger chamber, plunger and sealing ring must of course be coordinated with the dimensions and shape of the insert, so that the motion of the plunger does cause the sealing ring to deform so as to press against the insert. In the preferred embodiment, the dimensions of the resilient seal and the position of the walls of the plunger chamber are coordinated such that the resilient seal is substantially prevented from deforming outwardly when compressed by the action of the plunger. The contour of the resilient seal is substantially matched to the contour cooperatively defined by the seating surface, the plunger, and the walls of the plunger chamber, so that the only direction for the resilient seal to deform is essentially in the direction of the insert.

Thus in the illustrated embodiment, as seen most clearly in FIG. 3, the top of the plunger chamber 8 is radiused, as is the top of the plunger 12, forming a rounded shape which matches the shape of the resilient sealing ring, in this case an O-ring.

Alternatively, the sealing ring could have a rectangular cross-section, obviating any need to radius the plunger chamber and/or plunger.

In the invention as broadly defined, though preferable, it is not essential that the wall of the plunger chamber prevent the sealing ring from expanding outwardly, since there may be sufficient inward expansion to nevertheless properly seal the insert from the cavity, or the characteristics of the particular sealing ring selected for the job may be such that it is more inclined to deform inwardly than outwardly.

Thus a number of alternative configurations can be conceived by anyone of ordinary skill in the field, such as for example the configurations shown in FIGS. 8 and 9. In the former, a configuration such as the one described in the preceding paragraph is shown, in which there is nothing other than the characteristics of the sealing ring itself to prevent outward expansion. In the latter, the sealing ring is shown trapped between the flange and an annular extension 17 of the plunger.

In the preferred embodiment, in order that the seal can be positioned as closely as possible to the plastic, the flange 9, or at least a portion thereof, is beveled outwardly in the direction of the cavity, at bevelled surface 18. Thus plastic injected into the cavity will meet said insert with a ramp-like profile, corresponding to the shape of the bevel, and will terminate as close as possible to the seal.

Also in the preferred embodiment, the plunger has an axial opening 19, seen best in FIG. 6, adapted to receive and properly position the insert in the insert opening and cavity. For the type of insert shown, i.e. one which passes through the part, the upper mold half 2 may be provided with a corresponding opening 20 so that the insert is positively positioned at both ends.

The resilient sealing ring 11 may be of any suitable material, but in the preferred embodiment is of a fluorocarbon material such as VITON (trademark). The material should be selected with a view not only to its resiliency, but also with a view to its ability to withstand repeated cycling at high temperatures and pressures.

Once the part has been produced in the cavity, ejector pins 21 are actuated in the conventional manner (not shown) to eject the part from the cavity.

Many variations on the invention as described above will be apparent or obvious to those knowledgeable in the field. Such apparent or obvious variations are intended to be included within the scope of the invention, whether or not expressly described or claimed herein.

For example, it should be apparent that any given part could have a number of inserts, and each insert location could embody the invention. Also, an insert could be of the type which passes through the plastic part, in which case the locations of both ends of the insert could embody the invention.

The means by which the plunger is activated for relative motion with respect to the insert location so as to deform the sealing ring is not relevant to the invention as broadly defined and claimed.

Although preferable to have the beveled surface 18, many of the goals of the invention can be achieved without such bevelling, though the axial dimension of the flange should not be too great, so that the sealing ring is not too remote from the cavity.

The "radial" surface of the flange need not be exactly radial, i.e. at ninety degrees to the axial direction, but may be angled inwardly towards the cavity.

The insert opening need not be at ninety degrees to the cavity, i.e. the insert could be intended to enter the plastic part at an angle.

The application of the invention is not limited to injection molding. The invention obviously can be applied to any molding process.

What is claimed as the invention is:

1. In apparatus for the production of plastic molded parts, said apparatus including a mold cavity cooperatively defined by at least two mold blocks, and at least one said mold block having at least one insert opening communicating with said cavity whereby an insert may be positioned in said insert opening to project into or through said cavity, an improvement directed to preventing the escape of flash from the cavity in the area of each said insert and each said insert opening, said improvement comprising:

a plunger chamber substantially co-axial to said insert opening and communicating with said cavity via said insert opening, said plunger chamber having generally greater radial dimensions than said insert opening, thereby defining a generally inwardly-directed flange with respect to the walls of said plunger chamber, the surface of said flange remote from said cavity constituting a seating surface within said insert opening;

a resilient seal adapted to fit within said plunger chamber against said seating surface in proximity to said insert;

a plunger positioned within said plunger chamber for relative movement generally towards and away from said cavity to compress said resilient seal against said seating surface, whereby relative movement generally towards said cavity forces said resilient seal to deform inwardly towards and against said insert to thereby grasp said insert and effect a seal; and means for producing said relative movement of said plunger with respect to said cavity.

2. The improvement as recited in claim 1, in which the dimensions and configurations of said resilient seal and of said plunger and the walls of said plunger chamber are coordinated such that said resilient seal is substantially prevented from deforming outwardly when compressed by the action of said plunger.

3. The improvement as recited in claim 2, in which the contour of said resilient seal is substantially matched to the contour cooperatively defined by said seating surface and the walls of said plunger chamber, whereby said resilient seal is substantially prevented from deforming in any direction other than inwardly towards said insert.

4. The improvement as recited in claim 1, in which at least a portion of said flange is beveled outwardly in the direction of the cavity, whereby plastic injected into said cavity will meet said insert with a ramp-like profile terminating adjacent the region of said resilient seal.

5. The improvement as recited in claim 2, in which at least a portion of said flange is beveled outwardly in the direction of the cavity, whereby plastic injected into said cavity will meet said insert with a ramp-like profile terminating adjacent the region of said resilient seal.

6. The improvement as recited in claim 3, in which at least a portion of said flange is beveled outwardly in the direction of the cavity, whereby plastic injected into said cavity will meet said insert with a ramp-like profile terminating adjacent the region of said resilient seal.

7. The improvement as recited in claim 1, in which said plunger has an axial opening adapted to receive and properly position the insert in the insert opening and cavity.

8. The improvement as recited in claim 2, in which said plunger has an axial opening adapted to receive and properly position the insert in the insert opening and cavity.

9. The improvement as recited in claim 3, in which said plunger has an axial opening adapted to receive and properly position the insert in the insert opening and cavity.

10. The improvement as recited in claim 4, in which said plunger has an axial opening adapted to receive and properly position the insert in the insert opening and cavity.

11. The improvement as recited in claim 5, in which said plunger has an axial opening adapted to receive and properly position the insert in the insert opening and cavity.

12. The improvement as recited in claim 6, in which said plunger has an axial opening adapted to receive and properly position the insert in the insert opening and cavity.

13. The improvement as recited in claim 1, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

14. The improvement as recited in claim 2, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

15. The improvement as recited in claim 3, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

16. The improvement as recited in claim 4, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

17. The improvement as recited in claim 5, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

18. The improvement as recited in claim 6, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

19. The improvement as recited in claim 7, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

20. The improvement as recited in claim 8, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

21. The improvement as recited in claim 9, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

22. The improvement as recited in claim 10, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

23. The improvement as recited in claim 11, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

24. The improvement as recited in claim 12, in which each mold block embodying the improvement is spring-biased a short distance away from a base member, and is moveable towards and away from said base member, and in which the end of said plunger remote from said resilient seal is positioned against said base member such that when the mold blocks are forced towards each other, each said mold block embodying the improvement is forced through said short distance to contact its base member, whereupon said plunger acts upon said resilient seal, thereby deforming said resilient seal and forcing said resilient seal inwardly towards and against said insert to thereby grasp said insert and effect a seal.

* * * * *